Dec. 18, 1928. 1,695,894
W. E. GLASPEY
MACHINE FOR MAKING GLASS CONTAINERS
Filed Dec. 9, 1927 4 Sheets-Sheet 3
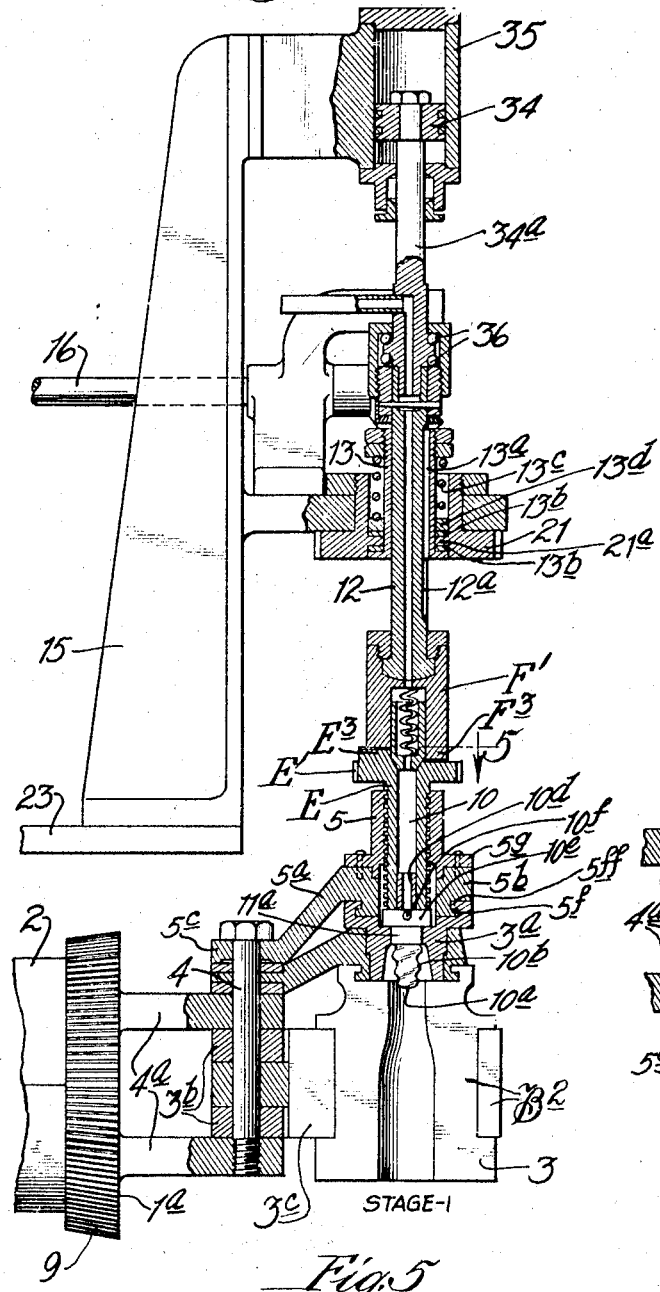
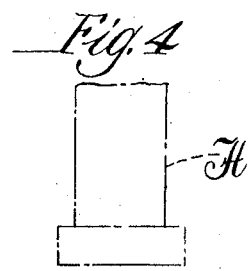
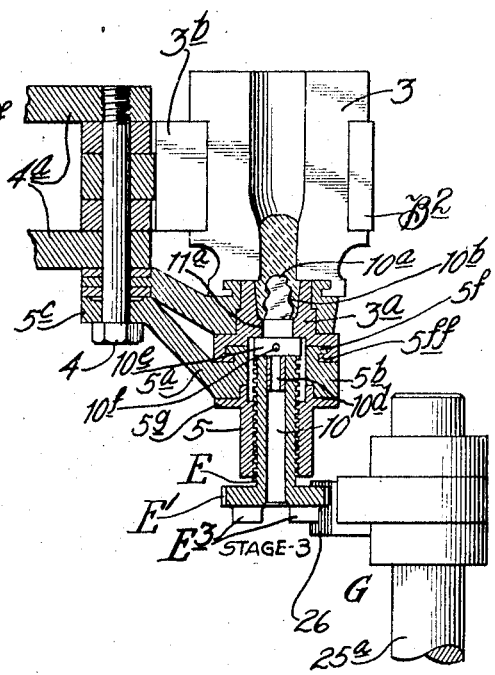
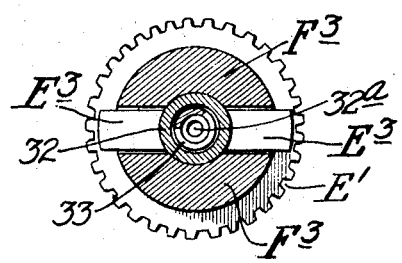
Inventor:
Warren E. Glaspey
By Dyrenforth, Lee, Chritton & Wiles,
Attys.

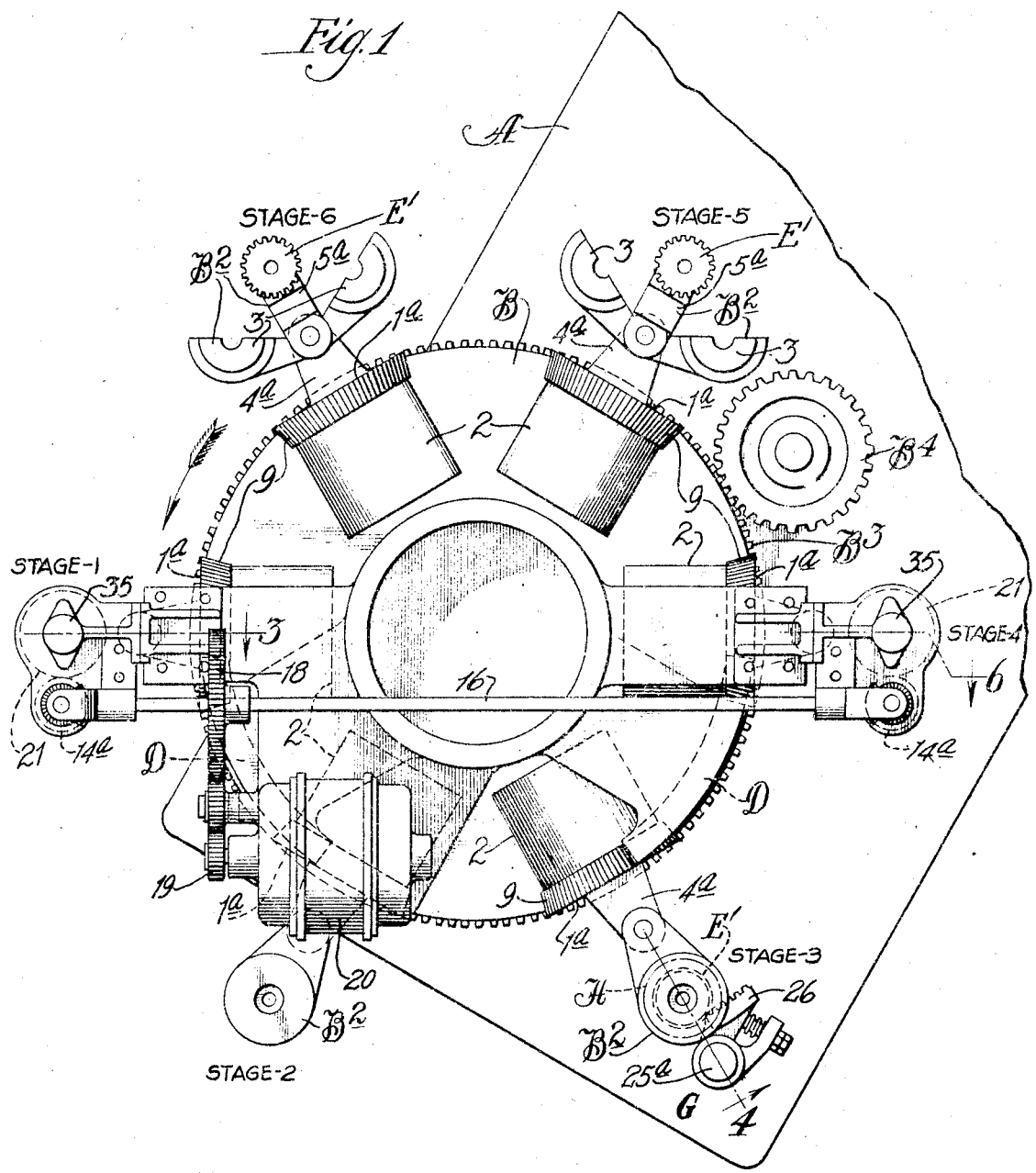

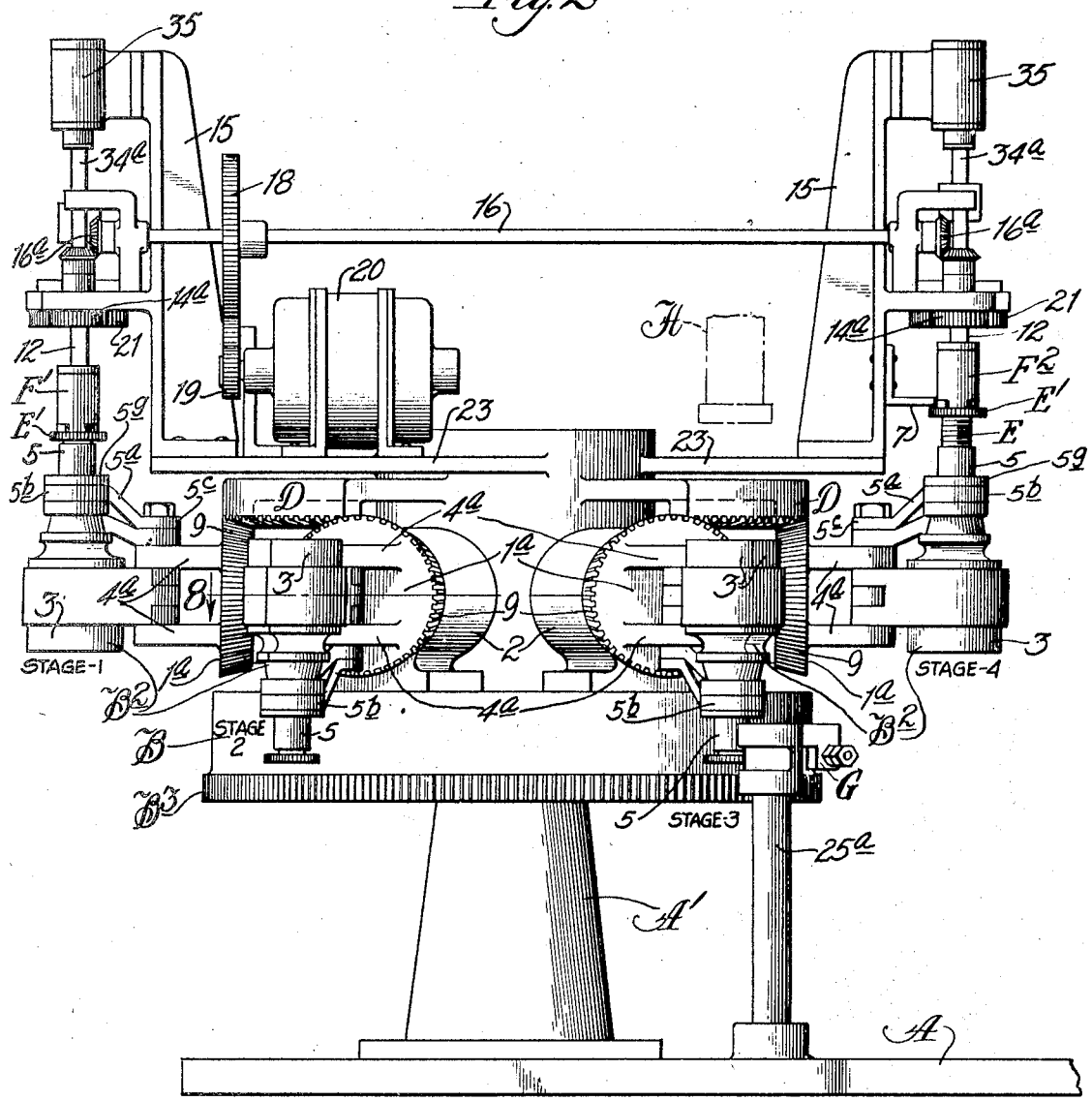

Dec. 18, 1928.　　　　　　W. E. GLASPEY　　　　　　1,695,894
MACHINE FOR MAKING GLASS CONTAINERS
Filed Dec. 9, 1927　　　4 Sheets-Sheet 4
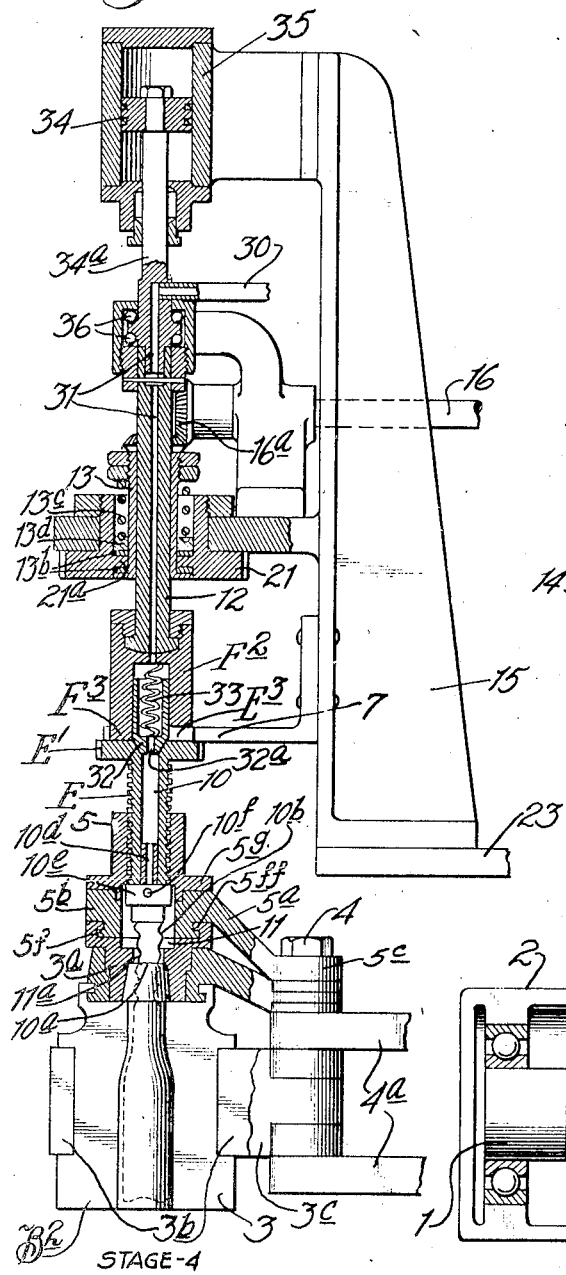
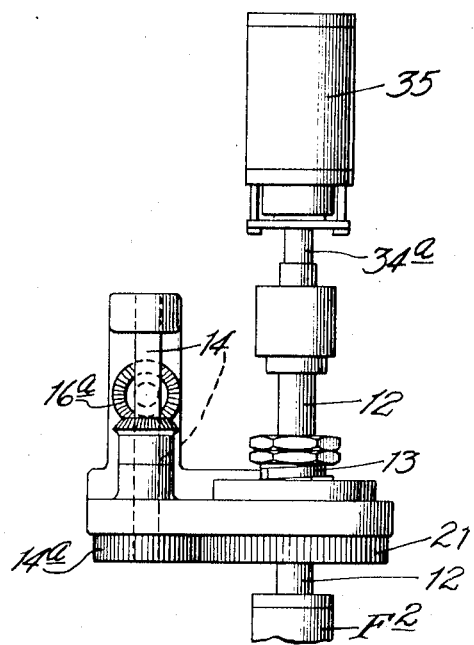
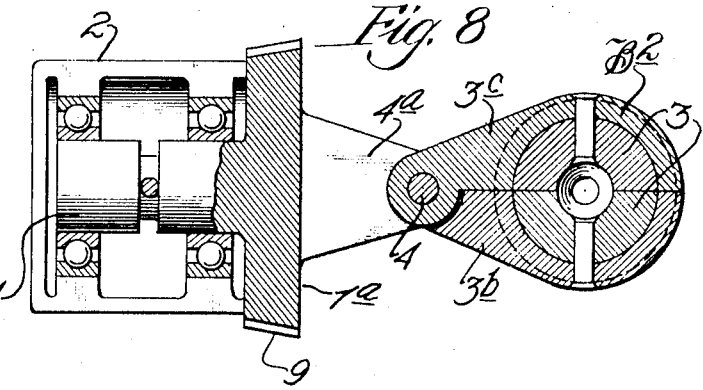

Patented Dec. 18, 1928.

1,695,894

UNITED STATES PATENT OFFICE.

WARREN E. GLASPEY, OF BRIDGETON, NEW JERSEY, ASSIGNOR TO SPRING STOPPER COMPANY, A CORPORATION OF DELAWARE.

MACHINE FOR MAKING GLASS CONTAINERS.

Application filed December 9, 1927. Serial No. 238,936.

This invention relates to improvements in a machine for making glass containers, and more particularly glass containers provided with internally threaded mouth portions adapted to receive threaded stoppers, and the like.

The primary object of the invention is to adapt such a machine to the production of containers provided with internally threaded mouth portions; and the invention involves the combination with the mechanisms of a machine for making a container, of means co-operating with such mechanisms for producing internal threads in the mouths of the containers.

The general type of machine without considering the formation of internal threads in the mouths of the containers, forms no part of the present invention, and consequently will not be described here in detail. This general type of machine is sometimes known as the "Lynch" machine.

My invention relates more particularly to the provision of means co-operating with a machine of the type described for producing internal threads in the mouths of the containers, and will be described more in detail hereinafter.

As shown in the drawings, Figure 1 is a top plan view of the rotary mold carrier, Fig. 2 is a view of the machine in side elevation, Fig. 3 is a view taken as indicated by the line 3 of Fig. 1, Fig. 4 is a view taken as indicated by the line 4 of Fig. 1, Fig. 5 is a view taken as indicated by the line 5 of Fig. 3, Fig. 6 is a view taken as indicated by the line 6 of Fig. 1, Fig. 7 is a partial end elevation of the parts shown in Fig. 6, and Fig. 8 is a view taken as indicated by line 8 of Fig. 2.

As shown in the drawings, A indicates the base of a frame from which rises a stationary shaft or column A'. B indicates a rotary table or mold carrier mounted on the column A'.

The mold carrier B has mounted thereon a plurality (here shown six in number) of bearing boxes 2, each having rotatably mounted therein a mold support comprising a gudgeon 1 rotatably mounted in the bearing box 2 and provided on its end with a face plate $1^a$ carrying the projecting lugs $4^a$, $4^a$. The mold, indicated in general by $B^2$ is carried by the arms $4^a$, $4^a$, and comprises a pair of main mold sections 3 and a pair of ring mold sections $3^a$. These sections meet in a vertical plane and are provided with arms $3^c$ and $3^b$, respectively, which are connected at their inner ends with a pivot 4 carried by the lugs $4^a$ projecting from the face plate $1^a$. By this construction the mold sections are capable of separating in a vertical plane passing through the axis of the mold.

The mold table or carrier B is provided with a gear $B^3$, and is adapted to be rotated to give it an intermittent or step by step movement, by means of the gear $B^4$ which may be operated by any suitable mechanism (not shown).

H indicates a blow head forming a part of this type of machine employed for blowing the glass down into the mold so that it will form properly about the tip of the mandrel in the neck portion of the mold. This blow head forms no part of the present invention as it is in common use on this general type of machine. The means for supplying molten glass to the molds is well known in this kind of machine, and consequently not shown here.

Each face plate $1^a$ carries a bevel gear 9 adapted to mesh with the bevel racks D and revolve the mold supports on their axes during the rotation of the mold table B. Each rack D is a stationary rack supported in any suitable manner. The molds may be maintained in their normal upright position by any suitable means (not shown). For example, the mold support may have frictional resistance in the bearing box 2 so that it will remain stationary therein except when the bevel gear 9 engages one of the racks D.

A general description of some of the steps of operation at this point will make an understanding of the construction and operation more clear. The mold table B moves one step at a time, thus requiring six steps to complete its rotation. For convenience, these steps may be referred to as stages and, likewise for convenience, stage 1 will be called the position so indicated in Fig. 1. The mold carrier at stage 1 is also shown in Fig. 3. In Fig. 1, the arrows show the direction of rotation of the table. At stage 1, the threaded mandrel for forming the threads in the neck of the container is placed in position. The details of this will be described hereinafter. In moving from stage 1 to stage 2, the bevel gear 9 engages the first rack bar D to invert the mold. The mold then moves to stage 3, where the glass charging operation and the operation of blowing the glass down into the lower portion of the inverted mold is performed. As the mold leaves stage 3 the reverse or unscrewing movement of the mandrel is started by a device to be described more in detail hereinafter. A complete withdrawal of the mandrel is effected at stage 4. This will be described more in detail hereinafter.

I shall now describe more in detail the construction and operation of the mechanism for forming the internal threads in the neck portions of the containers. Associated with each mold is a threaded mandrel or plunger E working in a nut 5, which is rigidly secured to a collar $5^b$ carried on the end of a bracket $5^a$, supported at $5^c$, by the bolt 4. The collar $5^b$ is located directly above the mold 3, $3^a$, and is provided at its lower side with a peripheral flange $5^f$ which interlocks with flanges $5^{ff}$ on the ring sections $3^a$ of the mold. The nut 5 has a portion which projects into the collar $5^b$ and is provided with a flange $5^g$ secured in any suitable manner to the collar $5^b$.

Each mandrel E is equipped at its projecting upper end with a gear element E'. F' indicates a continuously rotating mandrel lowering head located at stage 1, and $F^2$ indicates a continuously rotating mandrel elevating head located at stage 4. The head elements F' and $F^2$ rotate in opposite directions. Each of the heads F' and $F^2$ is located directly over the annular path of the gears E' on the mandrel E. Each of the heads F' and $F^2$ is mounted on the lower end of a vertical shaft 12 adapted to be rotated by a gear 21 in frictional engagement with the sleeve 13. The shaft 12 is non-rotatably mounted in the sleeve 13, but is free to move vertically therein. This is accomplished by providing the sleeve 13 with a key $13^a$ operating in a keyway $12^a$ in the shaft 12. Frictional engagement between the gear 21 and the sleeve 13 is accomplished by means of the friction washers $13^b$ held in contact with the faces $21^a$ of the gear 21 by pressure from the spring $13^c$ acting through the washers $13^d$. By this construction, the shaft 12 is caused to rotate until the mandrel E reaches its upper or lower limit. At such time, the mandrel E, head F' or $F^2$, shaft 12 and friction sleeve 13 cease to revolve and the remainder of the gear mechanism continues to revolve. The gear 21 is actuated by a pinion $14^a$ mounted on a vertical shaft 14 which is driven from a horizontal shaft 16 carrying the bevel gears $16^a$. The shaft 16 may be driven in any suitable manner, for example, through a gear 18 which in turn may be driven by a pinion 19 on the shaft of the electric motor 20.

15 indicates a bracket mounted on a plate 23 which in turn is mounted on the frame of the machine. The bracket 15 is adapted to support the mandrel raising and lowering mechanism above described.

Each mandrel E preferably comprises a tubular shank portion 10 provided with a tip portion $10^a$ having an external thread $10^b$ corresponding in pitch with the pitch of the thread working in the nut 5. The tip portion $10^a$ is provided with a tubular shank $10^d$ and a collar $10^e$. Air may pass through the tubular shanks 10 and $10^d$ and out through the radial openings $10^f$, thus gaining access to the chamber 11 below the nut 5. The chamber 11 communicates through a central passage $11^a$ with the neck portion of the mold cavity. Thus, when the mandrel is retracted at stage 4, as shown in Fig. 6, air may pass from the bubble blower into the cavity in the glass and blow the glass to complete parison form.

30 indicates an air pipe adapted to supply air under pressure from any suitable source to the passage 31 in the shaft 12, and from there through the orifice $32^a$ in tip 32. A spring 33 holds the tip 32 in airtight contact with the upper end of the mandrel E, and the air is adapted to pass through the mandrel E and out through the radial openings $10^f$, as explained above.

36 indicates ball-bearings permitting the shaft 12 to turn freely on the end of piston rod $34^a$.

At stages 1 and 4, cylinders 35 with pistons 34 are provided to raise and lower the heads F' and $F^2$. Air under pressure is supplied to these cylinders so that piston 34 is forced downwardly during the time the mold carrier B is stationary, and forced upwardly during the time the mold carrier B is turning. These pistons 34 in the cylinders 35 are provided to force the heads F' and $F^2$ with their projecting lugs $F^3$ into contact with the lugs $E^3$ on the upper surface of the gear E'.

At stage 1, the head F' is lowered by the piston 34 until the lugs $F^3$ come in contact with the lugs $E^3$. The rotation of the head then serves to screw the mandrel down until the face of the collar $10^e$ comes into contact with the neck portion of the mold $3^a$, when the mandrel E and the head F' will become stationary by reason of the friction washers $13^b$ slipping. This condition maintains until the time arrives for the rotary mold carrier to turn, when the air pressure in the cylinder is reversed, causing the shaft 34 to rise and withdraw the head F'.

At stage 4, the head $F^2$ is lowered in the same manner until the lugs $F^3$ engage the lugs $E^3$ on the gear E' so that the rotation of the head $F^2$ operates to screw the mandrel E up until one of the projecting lugs $E^3$ strikes the stop-finger 7. The air pressure which lowers the piston 34 is sufficiently light to enable the head F² to be raised by the mandrel as the mandrel screws upwardly. When the time arrives for the rotary mold carrier to turn, the air pressure in cylinder 35 is reversed causing the piston 34 to rise and withdraw the head F² from engagement with the lugs E³.

Between stage 3 and stage 4 is located an auxiliary mandrel actuating device, indicated in general by G. This comprises a gear segment or rack 26 mounted on the post 25ª. The gear segment 26 is adapted to be engaged by the gear E' on the mandrel E during the passage of the molds from stage 3 to stage 4. The chief purpose is to loosen the mandrel from the glass when the glass has become sufficiently hardened to permit this to be done, and before the glass is hardened to a point which might make it difficult to release the thread of the mandrel from the threads formed in the glass. Ordinarily, the rack 26 does not have to be of sufficient length to turn the mandrel completely down. The complete retraction of the mandrel is effected by the gear F² at stage 4. If desired, the auxiliary device G may be dispensed with and the entire retraction of the mandrel effected at stage 4 by the head F².

While I have shown and described certain embodiments of my invention, it is to be understood that it is capable of many modifications. Changes, therefore, in the construction and arrangement may be made without departing from the spirit and scope of the invention as disclosed in the appended claim, in which it is my intention to claim all novelty inherent in my invention as broadly as possible in view of the prior art.

What I claim as new, and desire to secure by Letters Patent, is:

In a machine of the character set forth; a rotatable mold carrier with a plurality of invertible molds, one of such molds being located at each stage; means for rotating the mold carrier step by step to bring each of the molds successively into position at each stage; a mandrel with a threaded tip arranged above each mold; means at one stage to lower the mandrel to move the threaded tip into the neck of the mold; means to cause inversion of the mold in its movement toward a succeeding stage; means for inserting a charge of glass in the mold at a succeeding stage while inverted; means for unscrewing the threaded tip of the mandrel to loosen the same from the glass charge; means for righting the mold in its movement toward a succeeding stage; and means for raising the mandrel from the glass charge in the mold at a succeeding stage.

In witness whereof, I have hereunto set my hand this 23d day of November, 1927.

WARREN E. GLASPEY.